Nov. 4, 1930.     N. A. CHRISTENSEN     1,780,642
COMPRESSOR
Filed March 15, 1929
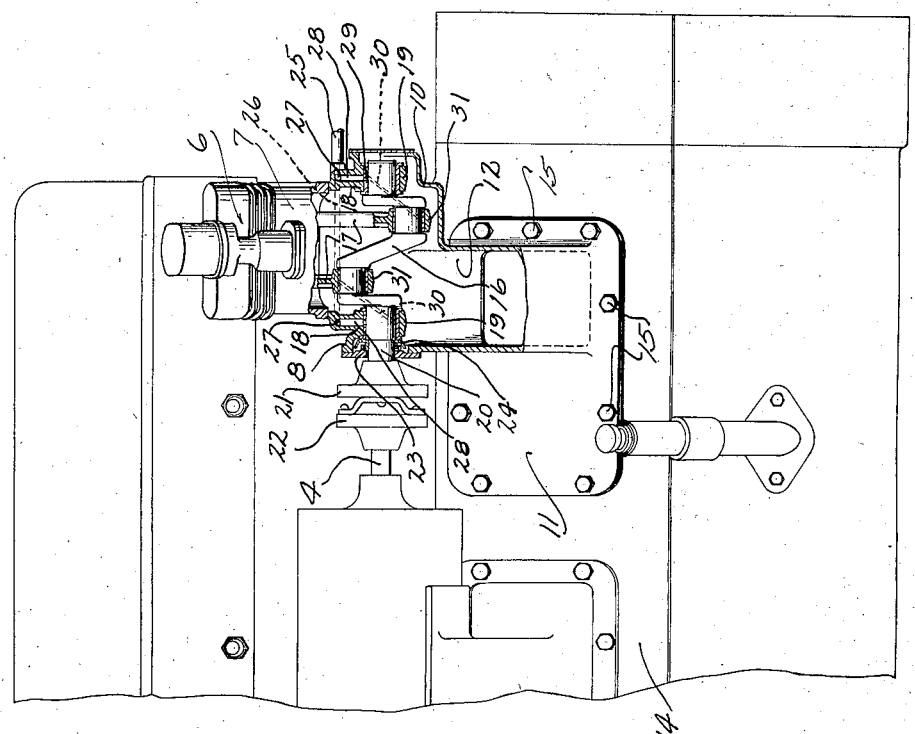
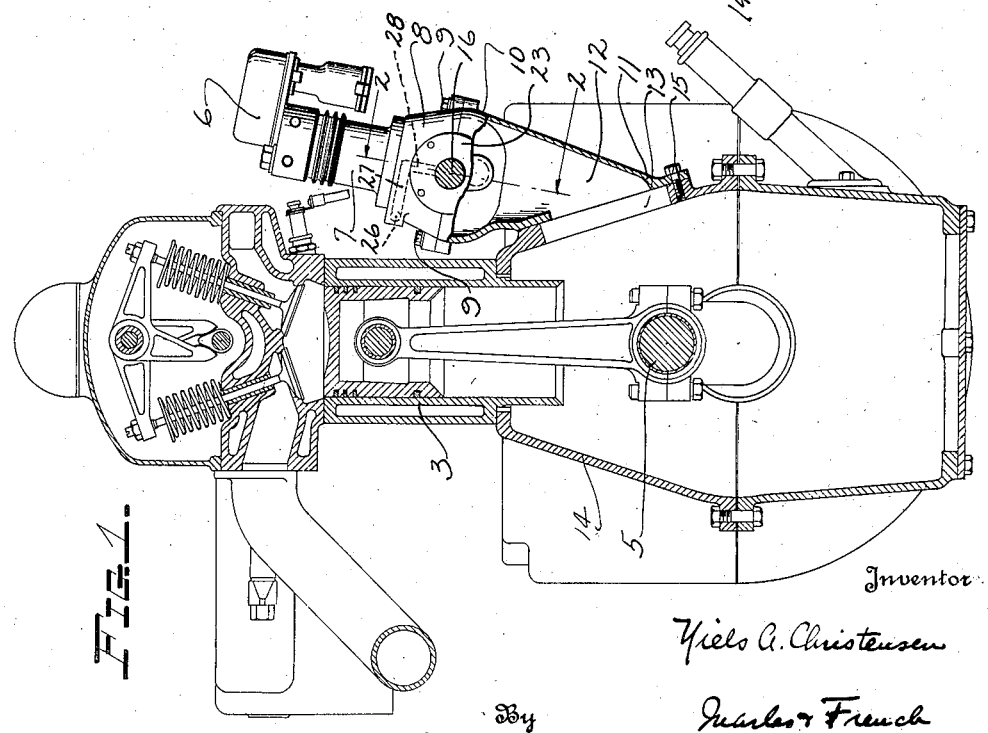
Inventor
Niels A. Christensen
By Charles T. French
Attorneys Patented Nov. 4, 1930

1,780,642

UNITED STATES PATENT OFFICE

NIELS A. CHRISTENSEN, OF CLEVELAND, OHIO

COMPRESSOR

Application filed March 15, 1929. Serial No. 347,219.

The invention relates to compressors and more particularly to compressors driven by the engines of automotive vehicles for furnishing compressed air for the braking and/or starting systems for such vehicles.

It has heretofore been proposed to drive the compressor from a lay shaft, such as the generator shaft of an automotive vehicle, but all prior commercial constructions of which I am aware have proven unsatisfactory. I attribute most of these difficulties to the manner of mounting and lubricating the compressor, both of which features are of vital importance in securing efficient operation and long life. According to the present invention these difficulties have been overcome by supplying a force-feed lubrication of the crank shaft of the compressor from the pressure supply of the engine and allowing the excess oil to lubricate the compressor cylinder, with provision, however, for an unimpeded drain of the oil back into the engine crank case. Furthermore, the lower half of the crank case of the compressor is formed as a side cover for the engine and has the large drain opening which allows the oil to drain freely from the compressor into the main engine crank case and thence to the sump.

The invention further consists in the several features hereinafter set forth and more particularly defined by claims at the conclusion hereof.

In the drawings Fig. 1 is a vertical sectional view through an automotive engine equipped with a compressor construction embodying the invention, parts being broken away and parts being shown in section;

Fig. 2 is a detail side elevation view of the engine, parts of the compressor being shown in section as taken along the line 2—2 of Fig. 1.

Referring to the drawings the numeral 3 designates an internal combustion engine of the automotive type which has a lay-shaft 4, here shown as the generator drive shaft driven from the crank shaft 5 of the engine in known manner and 6 designates the compressor, here shown as a two cylinder compressor.

The construction of the cylinder 7, the pistons (not shown) working therein and the inlet and discharge valves (not shown) of said compressor are all old and well known and as the invention is concerned with the manner of lubricating the moving parts and mounting the compressor on the engine, further showing or description of these well known parts is considered unnecessary.

The cylinders 7 are mounted on the upper half 8 of the crank case which is secured by bolts 9 to the lower half 10 of the crank case, which is formed as an integral part of a side cover 11 having a large drain opening 12 extending from the bottom of the crank case 10 to the side opening 13 in the crank case 14 of the engine, said cover being secured to said engine by bolts 15.

The crank shaft 16 of the compressor, upon which the connecting-rods 17 for driving the compressor pistons are mounted in known manner, is journalled in bearings 18 in the upper half 8 of the crankcase and in bearing caps 19 secured thereto. One end 20 of the crank shaft extends beyond the crankcase and carries a coupling flange 21 secured by a suitable flexible coupling 22 to the shaft 4.

An end-plate 23 is secured to both halves of the crankcase through which the crank shaft 16 projects and an oil thrower ring 24 is mounted on said shaft adjacent said plate in order to form an oil-tight joint and the oil thrown off drains back directly through the opening 12 into the crankcase of the engine.

A pipe 25, receiving lubricant from the pressure lubricant supply of the engine, communicates with a lengthwise extending passage 26 formed in the lower crankcase and this passage has branch passages 27 leading therefrom which communicate with vertically disposed passages 28 that lead into holes 29 in the bearings for the crank shaft 16, whereby these bearings receive an adequate supply of oil.

The crank shaft 16 also has the inclined drilled passages 30 that connect each of its bearing portions with the crank bearings 31, whereby the big end bearings of the connecting-rods receive the proper amount of lubricant.

There is no splash oiling employed in this arrangement excepting what spray may be thrown up against the pistons during the working of the compressor. The inside of the crankcase of the compressor is in wide open connection with the engine crankcase and thus may receive heavily charged vapor within its crankcase, but at no time is there any great accumulation of oil within the compressor, as it drains freely back into the engine crank case.

With the above arrangement the oil for the cylinders is not delivered thereto under high pressure but the oil is checked or held back to some extent because it has to find its way out through the bearings and when it has passed through the constrictions and finally enters the compressor crank case it is freely drawn off into the engine crank case through the large opening 12 provided for that purpose. It will be noted that the sides of this opening form a large hollow pedestal connecting the compressor crank case with the plate 11.

As the lower half of the crank case is preferably formed as a part of the side cover plate, the compressor is rigidly mounted and the strains are transmitted to the main body of the engine in a most efficient manner.

I desire it to be understood that this invention is not to be limited to any particular form or arrangement of parts except insofar as such limitations are included in the claims.

What I claim as my invention is:

1. In an automotive engine, the combination with the pressure lubricating system and a lay shaft of said engine and the engine crank case having a side opening, of a cover plate for said side opening having a hollow pedestal portion extending therefrom, a compressor having its crankcase freely communicating with the engine crank case through said pedestal, said compressor having a crank shaft, driven from said lay shaft, a connecting-rod mounted thereon, and means for lubricating the bearings of said crank shaft and connecting-rod from the pressure lubricating system of the engine, the oil from said bearings being free to drain from said compressor crank case and with the vapor formed in the crank cases forming the sole source of lubricant for the cylinder of the compressor.

2. In an automotive engine, the combination with the pressure lubricating system and compressor drive means and the engine crank case having a side opening, of a cover plate for said side opening having a hollow pedestal extending therefrom and a compressor crank case portion, a compressor having a crank shaft mounted in said compressor crank case, and means for lubricating the moving parts of the compressor by oil supplied to said crank shaft, which oil is permitted to drain back freely into the engine crank case.

3. In an automotive engine, the combination with the pressure lubricating system and compressor drive means driven by the engine and the engine crank case having a side opening, of a compressor mounted on said engine and having its crank case freely communicating with said engine crank case through said side opening, a crank shaft mounted in said crank case, means for lubricating the bearings of the compressor crank shaft and connecting-rod from the lubricating system of the engine, the oil from said bearings being free to drain freely from the compressor crank case into the engine crank case and with the vapor formed in said crank cases forming the sole source of lubrication for the cylinder of the compressor.

In testimony whereof, I affix my signature.

NIELS A. CHRISTENSEN.